US012792923B2

(12) United States Patent
Momo et al.

(10) Patent No.: US 12,792,923 B2
(45) Date of Patent: Nov. 10, 2026

(54) METHOD FOR SUPPORTING DOCUMENT PREPARATION AND SYSTEM FOR SUPPORTING DOCUMENT PREPARATION

(71) Applicant: SEMICONDUCTOR ENERGY LABORATORY CO., LTD., Atsugi (JP)

(72) Inventors: Junpei Momo, Sagamihara (JP); Motoki Nakashima, Isehara (JP); Natsuko Takase, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 181 days.

(21) Appl. No.: 18/470,752

(22) Filed: Sep. 20, 2023

(65) Prior Publication Data

US 2024/0104291 A1 Mar. 28, 2024

(30) Foreign Application Priority Data

Sep. 22, 2022 (JP) ................................ 2022-151570

(51) Int. Cl.

*G06F 40/194* (2020.01)
*G06F 40/131* (2020.01)

(Continued)

(52) U.S. Cl.

CPC ............. *G06N 3/09* (2023.01); *G06F 40/131* (2020.01); *G06F 40/194* (2020.01); *G06F 40/197* (2020.01)

(58) Field of Classification Search

CPC .... G06F 40/131; G06F 40/194; G06F 40/197; G06F 40/166

See application file for complete search history.

(56) References Cited

U.S. PATENT DOCUMENTS 7,260,773 B2 * 8/2007 Zernik .................. G06F 40/194 707/999.203
8,205,155 B2 * 6/2012 Trotter .................. G06F 40/131 715/261

(Continued)

FOREIGN PATENT DOCUMENTS

JP 2009-245308 A 10/2009

OTHER PUBLICATIONS

Jimenez et al., UNAL-NLP: Combining Soft Cardinality Features for Semantic Textual Similarity, Relatedness and Entailment. In Proceedings of the 8th International Workshop on Semantic Evaluation (SemEval 2014), pp. 732-742, Dublin, Ireland; https://aclanthology.org/S14-2131/ (Year: 2014).*

(Continued)

*Primary Examiner* — Benjamin Smith
(74) *Attorney, Agent, or Firm* — Fish & Richardson P.C.

(57) ABSTRACT

To support preparation of a document with consistency. First document data and second document data are received, the first document data is divided into a plurality of first blocks, the second document data is divided into a plurality of second blocks, a plurality of first combinations each including corresponding first and second blocks are determined, and of the plurality of first combinations, one or more second combinations with a difference between the corresponding first and second blocks are shown, any one of the plurality of first blocks included in the second combinations is received as a first designated block, the second block corresponding to the first designated block is received as a second designated block, and of the first combinations, a third combination in which presence or absence of establishment of textual entailment between the first designated block and the first block is different from presence or (Continued)

absence of establishment of textual entailment between the second designated block and the second block is shown.

8 Claims, 8 Drawing Sheets

(51) Int. Cl.
*G06F 40/197* (2020.01)
*G06N 3/09* (2023.01)

(56) References Cited

U.S. PATENT DOCUMENTS

| | | | | |
|---|---|---|---|---|
| 9,747,259 | B2 * | 8/2017 | Kapadia | G06F 40/194 |
| 10,216,715 | B2 * | 2/2019 | Broderick | G06F 40/186 |
| 10,515,149 | B2 * | 12/2019 | Herr | G06F 40/194 |
| 10,713,432 | B2 * | 7/2020 | Goyal | G06F 16/288 |
| 10,839,284 | B2 * | 11/2020 | Hashimoto | G06N 3/044 |
| 11,023,721 | B2 * | 6/2021 | Mikami | G06F 40/194 |
| 11,151,307 | B2 * | 10/2021 | Rastogi | G06F 40/109 |
| 11,151,325 | B2 * | 10/2021 | Turkkan | G06F 40/205 |
| 11,455,543 | B2 * | 9/2022 | D'Souza | G06N 5/025 |
| 11,544,466 | B2 * | 1/2023 | Kamijoh | G06F 40/166 |
| 11,681,735 | B2 * | 6/2023 | Roman | G06F 40/194 |
| | | | | 707/603 |
| 11,803,758 | B2 * | 10/2023 | Liu | G06V 10/7784 |
| 11,816,419 | B2 * | 11/2023 | Huppe | G06F 40/117 |
| 11,853,969 | B2 * | 12/2023 | Dimino | G06F 40/30 |
| 11,972,212 | B2 * | 4/2024 | Sackett | G06F 40/279 |
| 12,008,459 | B2 * | 6/2024 | Chen | G06N 3/0895 |
| 12,072,897 | B2 * | 8/2024 | Gaur | G06F 16/24578 |
| 12,073,185 | B2 * | 8/2024 | Heo | G06F 40/279 |
| 12,112,133 | B2 * | 10/2024 | Ogura | G06F 40/30 |
| 12,118,295 | B2 * | 10/2024 | Aggarwal | G06F 40/289 |
| 12,135,951 | B2 * | 11/2024 | Zhang | G06F 40/58 |
| 12,141,535 | B2 * | 11/2024 | Galitsky | G06N 3/08 |
| 12,242,971 | B2 * | 3/2025 | Liu | G06N 3/08 |
| 12,340,792 | B2 * | 6/2025 | Qu | G10L 15/16 |
| 12,367,188 | B2 * | 7/2025 | Frost | G06F 16/35 |
| 12,374,459 | B2 * | 7/2025 | Weston | G06N 20/00 |
| 12,417,349 | B2 * | 9/2025 | Gaur | G06F 16/243 |
| 2005/0010863 | A1 * | 1/2005 | Zernik | G06F 40/131 |
| | | | | 715/229 |
| 2009/0249197 | A1 | 10/2009 | Nagase et al. | |
| 2010/0100817 | A1 * | 4/2010 | Trotter | G06F 40/131 |
| | | | | 715/261 |
| 2015/0012528 | A1 * | 1/2015 | Kapadia | G06F 40/169 |
| | | | | 707/758 |
| 2016/0283472 | A1 * | 9/2016 | Yamaoka | G06F 40/194 |
| 2017/0039176 | A1 * | 2/2017 | Broderick | G06F 40/186 |
| 2018/0121788 | A1 * | 5/2018 | Hashimoto | G06F 40/30 |
| 2018/0121799 | A1 * | 5/2018 | Hashimoto | G06F 40/284 |
| 2018/0300296 | A1 * | 10/2018 | Ziraknejad | G06F 16/93 |
| 2019/0303435 | A1 * | 10/2019 | Herr | G06F 16/35 |
| 2019/0347284 | A1 * | 11/2019 | Roman | G06F 16/93 |
| 2020/0151244 | A1 * | 5/2020 | Rastogi | G06F 40/194 |
| 2020/0302018 | A1 * | 9/2020 | Turkkan | G06F 40/205 |
| 2020/0334520 | A1 * | 10/2020 | Chen | G06N 3/0455 |
| 2021/0056304 | A1 * | 2/2021 | Mikami | G06F 40/30 |
| 2021/0110277 | A1 * | 4/2021 | D'Souza | G06F 40/49 |
| 2021/0142181 | A1 * | 5/2021 | Liu | G06N 3/045 |
| 2021/0271821 | A1 * | 9/2021 | Kamijoh | G06N 20/00 |
| 2021/0326751 | A1 * | 10/2021 | Liu | G06F 18/24 |
| 2022/0237391 | A1 * | 7/2022 | Zhang | G06F 40/284 |
| 2022/0253611 | A1 * | 8/2022 | Galitsky | G06N 3/09 |
| 2022/0269685 | A1 * | 8/2022 | Gaur | G06F 16/93 |
| 2022/0366893 | A1 * | 11/2022 | Qu | G10L 15/063 |
| 2023/0013179 | A1 * | 1/2023 | Huppe | G06F 40/253 |
| 2023/0034401 | A1 * | 2/2023 | Weston | G06N 3/082 |
| 2023/0046851 | A1 * | 2/2023 | Ogura | G06F 40/30 |
| 2023/0061906 | A1 * | 3/2023 | Gaur | G06F 40/30 |
| 2023/0067435 | A1 * | 3/2023 | Heo | G06F 40/166 |
| 2023/0109483 | A1 * | 4/2023 | Dimino | G06F 40/30 |
| | | | | 715/751 |
| 2023/0147359 | A1 * | 5/2023 | Sackett | G06F 40/289 |
| | | | | 704/9 |
| 2023/0418873 | A1 * | 12/2023 | Gao | G06N 20/00 |
| 2024/0012996 | A1 * | 1/2024 | Chosa | G06N 5/041 |
| 2024/0104291 | A1 * | 3/2024 | Momo | G06F 40/205 |
| 2024/0119220 | A1 * | 4/2024 | Aggarwal | G06N 3/08 |
| 2024/0281705 | A1 * | 8/2024 | Liu | G06N 3/045 |
| 2024/0403563 | A1 * | 12/2024 | Bex, IV | G06F 16/383 |
| 2024/0411795 | A1 * | 12/2024 | Hong | G06F 16/338 |
| 2025/0021543 | A1 * | 1/2025 | Frost | G06F 16/35 |
| 2025/0142176 | A1 * | 5/2025 | Luo | G06F 40/279 |
| 2025/0165792 | A1 * | 5/2025 | Liu | G06N 3/08 |
| 2025/0173613 | A1 * | 5/2025 | Oktay | G16H 15/00 |

OTHER PUBLICATIONS

Devlin.J et al., "BERT: Pre-training of Deep Bidirectional Transformers for Language Understanding", arXiv:1810.04805v2, Oct. 11, 2018, Cornell University.

* cited by examiner

METHOD FOR SUPPORTING DOCUMENT PREPARATION AND SYSTEM FOR SUPPORTING DOCUMENT PREPARATION

BACKGROUND OF THE INVENTION

1. Field of the Invention

One embodiment of the present invention relates to a method for supporting document preparation. Another embodiment of the present invention relates to a system for supporting document preparation.

Note that one embodiment of the present invention is not limited to the above technical field. Examples of the technical field of one embodiment of the present invention include a semiconductor device, a display device, a light-emitting apparatus, a power storage device, a memory device, an electronic device, a lighting device, an input device (e.g., a touch sensor), an input/output device (e.g., a touch panel), driving methods thereof, and manufacturing methods thereof.

2. Description of the Related Art

A known function of word processing software is a function of editing a document with tracking changes. With this function, a user can see changes in the document later. Furthermore, without using track changes, it is possible to find out a difference between two documents by using a tool for analyzing a difference between the two documents.

One of known proofreading support techniques is a function of supporting consistency of terms in a document. For example, Patent Document 1 discloses a document proofreading support apparatus for supporting proofreading using replacement of terms in a document.

REFERENCE

[Patent Document 1] Japanese Published Patent Application No. 2009-245308

[Non-Patent Document 1] BERT: Pre-training of Deep Bidirectional Transformers for Language Understanding, Devlin et al. (Submitted on 11 Oct. 2018 (v1), last revised 24 May 2019 (this version, v2)), [online], internet <UREhttps://arxiv.org/abs/1810.04805v2>

SUMMARY OF THE INVENTION

To make consistency of text in one document, edited content of a part in a document should be reflected throughout the entire document. However, it is sometimes difficult to find out a part relating to the edited content. For example, in a longer document, it take a longer time to find out a part to be edited. In addition, it is difficult to find all parts to be edited. Therefore, the workload of revisions is increased. When a document is edited, meanings of sentences are changed with a high frequency. In this case, replacement of terms at a time is not sufficient to eliminate inconsistency in a document, differently from the case of discrepancy of terms.

An object of one embodiment of the present invention is to support preparation of a document with consistency. Another object of one embodiment of the present invention is to improve the efficiency of preparation or editing of a document. Another object of one embodiment of the present invention is to reduce the workload in editing a document.

Another object of one embodiment of the present invention is to provide a system for supporting document preparation or a method for supporting document preparation, which can provide high convenience. Another object of one embodiment of the present invention is to provide a novel system for supporting document preparation or a novel method for supporting document preparation.

Note that the description of these objects does not preclude the existence of other objects. One embodiment of the present invention does not need to achieve all of these objects. Other objects can be derived from the description of the specification, the drawings, and the claims.

One embodiment of the present invention is a method for supporting document preparation, including a first step of receiving first document data and second document data; a second step of dividing the first document data into a plurality of first blocks, dividing the second document data into a plurality of second blocks, determining a plurality of first combinations each including corresponding first and second blocks, and showing one or more second combinations with a difference between the corresponding first and second blocks, of the plurality of first combinations; a third step of receiving, as a first designated block, any one of the plurality of first blocks included in the second combinations, and receiving, as a second designated block, the second block corresponding to the first designated block; and a fourth step of showing, of the first combinations, a third combination in which presence or absence of establishment of textual entailment between the first designated block and the first block is different from presence or absence of establishment of textual entailment between the second designated block and the second block.

In the fourth step, it is preferable to determine whether or not textual entailment is established between the first designated block and the first block having a value representing a strength of a relation with the first designated block that is higher than or equal to a reference value, of the plurality of first blocks.

In the fourth step, a value representing a strength of a relation between the first block included in the third combination and the first designated block is preferably shown, as well as the third combination.

The fourth step preferably includes calculating a first determination value of each of first blocks other than the first designated block, regarding presence or absence of establishment of textual entailment with the first designated block; and calculating a second determination value of each of second blocks other than the second designated block, regarding presence or absence of establishment of textual entailment with the second designated block. The first determination value and the second determination value are preferably each determined in a numerical range including both negative and positive values, and of the first combinations, the third combination is preferably a combination in which a product of the first determination value and the second determination value is a negative value.

A difference in text between the corresponding first and second blocks corresponding to the first block is preferably colored and shown in the second step.

Similarities between the plurality of first blocks and the plurality of second blocks are preferably calculated, and the first combinations and the second combinations are preferably both determined on the basis of the similarities. Distributed representations of the plurality of first blocks and distributed representations of the plurality of second blocks are preferably obtained and the distributed representations of the plurality of first blocks are preferably compared with the distributed representations of the plurality of second blocks to calculate the similarities.

A fifth step of receiving editing of text included in the third combination is preferably included. A discriminator is preferably used in the fourth step, and after the fifth step, a combination of the first designated block and the first block before editing is preferably used as one piece of learning data having no establishment of textual entailment, and a combination of the first designated block and the first block after editing is preferably used as one piece of learning data having establishment of textual entailment, for learning by the discriminator.

Another embodiment of the present invention is a method for supporting document preparation, including a first step of receiving document data; a second step of dividing the document data into a plurality of blocks; a third step of calculating a value representing a strength of a relation between two blocks of the plurality of blocks, for each combination; a fourth step of determining presence or absence of establishment of contradiction between two blocks of the plurality of blocks, for each combination; and a fifth step of showing a combination of two blocks that is determined to have the value representing the strength of the relation higher than or equal to a reference value and have contradiction.

The fourth step is preferably performed on a combination having the value representing the strength of the relation calculated in the third step that is higher than or equal to the reference value.

The combination shown in the fifth step is preferably colored in accordance with the value representing the strength of the relation calculated in the third step.

Another embodiment of the present invention is a method for supporting document preparation, including a first step of receiving document data; a second step of dividing the document data into a plurality of blocks; a third step of classifying textual entailment between two blocks of the plurality of blocks into entailment, contradiction, and neutral, for each combination; and a fourth step of showing a combination of two blocks whose textual entailment is classified as contradiction.

Another embodiment of the present invention is a system for supporting document preparation, including a reception unit, a processing unit, and an output unit, the reception unit is configured to receive document data, the processing unit is configured to divide the document data into a plurality of blocks, calculate a value representing a strength of a relation between two blocks, classify textual entailment (or contradiction) between the two blocks, and extract a combination of the two blocks on the basis of the value representing the strength of the relation and classification of textual entailment (or contradiction), and the output unit is configured to output the combination.

Another embodiment of the present invention is a system for supporting document preparation, including a reception unit; a processing unit; and an output unit, the reception unit is configured to receive first document data and second document data, the processing unit is configured to divide the first document data into a plurality of first blocks, divide the second document data into a plurality of second blocks, determine a plurality of first combinations each including corresponding first and second blocks, extract, from the plurality of first combinations, one or more second combinations having a difference between the corresponding first and second blocks, receive, as a first designated block, any one of the first blocks included in the second combinations and as a second designated block, the second block corresponding to the first designated block, and extract, from the first combinations, a third combination in which presence or absence of establishment of textual entailment between the first designated block and the first block is different from presence or absence of establishment of textual entailment between the second designated block and the second block, and the output unit is configured to output the second combinations and output the third combination.

Any of the above-described systems for supporting document preparation preferably has a document editing function.

Another embodiment of the present invention is a program having a function of making a processor execute any of the above-described methods for supporting document preparation.

According to one embodiment of the present invention, preparation of a document with consistency can be supported. According to another embodiment of the present invention, the efficiency of preparation or editing of a document can be improved. According to another embodiment of the present invention, the workload in editing a document can be reduced.

According to another embodiment of the present invention, a system for supporting document preparation or a method for supporting document preparation, which can provide high convenience, can be provided. According to another embodiment of the present invention, a novel system for supporting document preparation or a novel method for supporting document preparation can be provided.

Note that the description of these effects does not preclude the existence of other effects. One embodiment of the present invention does not necessarily have all of these effects. Other effects can be derived from the description of the specification, the drawings, and the claims.

DETAILED DESCRIPTION OF THE INVENTION

Figure 1:
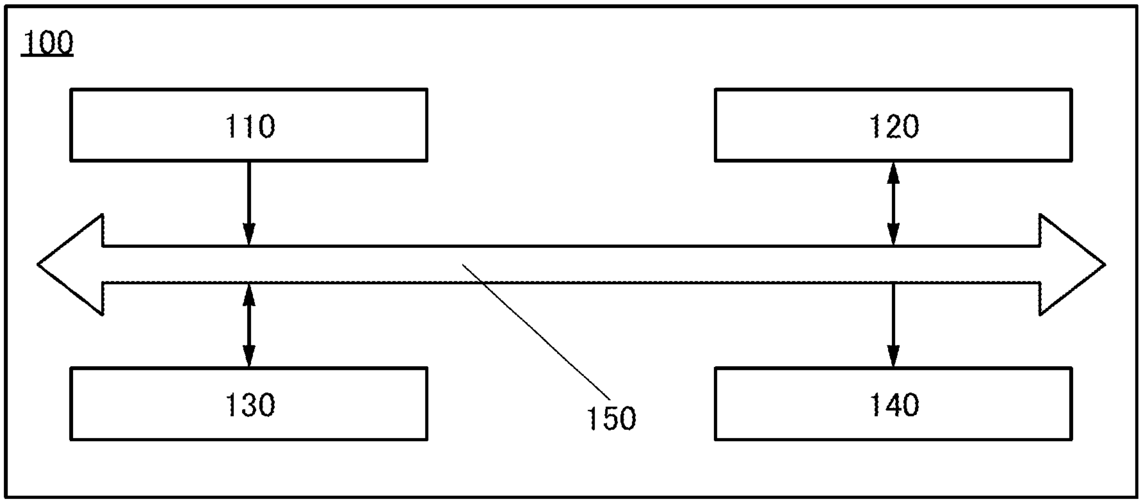
FIG. 1 illustrates an example of a system for supporting document preparation.

Embodiments will be described in detail with reference to the drawings. Note that the embodiments of the present invention are not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. The same hatch pattern is used for portions having similar functions, and the portions are not denoted by specific reference numerals in some cases.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Note that ordinal numbers such as "first" and "second" in this specification and the like are used for convenience and do not limit the number or the order (e.g., the order of steps or the stacking order) of components. The ordinal number added to a component in a part of this specification may be different from the ordinal number added to the component in another part of this specification or the scope of claims.

In this specification and the like, a document refers to description of an event made by natural language unless otherwise specified. The document is converted into an electronic form to be machine readable. In this specification and the like, text includes one sentence or a plurality of sentences.

Embodiment 1

In this embodiment, a system for supporting document preparation and a method for supporting document preparation of one embodiment of the present invention are described with reference to FIG. 1 to FIG. 6.

The system for supporting document preparation of one embodiment of the present invention can receive two documents which a user desires to compare and can show a part with a difference in textual entailment between the two documents. Thus, for example, a version before editing of a document and the revised version of the document are compared and a part that should be revised additionally accompanied with the revision can be shown.

Specifically, in a system for supporting document preparation of one embodiment of the present invention, two pieces of document data (first document data and second document data) are received. Next, the first document data is divided into a plurality of first blocks, and the second document data is divided into a plurality of second blocks. Next, a plurality of first combinations each including the corresponding first and second blocks are determined. In addition, of the plurality of first combinations, one or more second combinations having a difference between the first block and the second block are shown Of the second combinations shown, the user of the system can designate one combination (including a first designated block and a second designated block) or a plurality of combinations.

Next, in the system, of the first combinations, a third combination is shown in which presence or absence of establishment of the textual entailment between the first designated block and the first block is different from presence or absence of establishment of the textual entailment between the second designated block and the second block. It can be regarded that textual entailment is established between one of the first block and the second block of the third combination and its corresponding designated block and textual entailment is not established between the other of the first block and the second block of the third combination and its corresponding designated block.

Here, the case in which textual entailment is established between two blocks includes a case in which contents of the two blocks are similar. Furthermore, the case in which textual entailment is not established between two blocks includes a case in which the two blocks have low relevance and a case in which contradiction is established between the two blocks.

In this manner, in the system for supporting document preparation of one embodiment of the present invention, a part of a document in which a relation between two blocks is changed before and after revision can be shown. Therefore, the user can easily find a part that should be edited in the document and efficiently prepare the document.

For example, as a method for showing the part, one or both of displaying results on a display screen of a terminal of the user and outputting a file in a CSV format or the like can be performed.

The system may further calculate one or both of a value representing the strength of a relation between the designated first block and the first block and a value representing the strength of a relation between the designated second block and the second block. The designated block is related to not all the other blocks, and is often strongly related to some of the blocks only. Thus, by calculating the values representing the strength of a relation between blocks, a combination of blocks having a high relevance and a change in the relation before and after revision can be shown.

The system for supporting document preparation of one embodiment of the present invention may have a document editing function. The system for supporting document preparation of one embodiment of the present invention may be a part of word processing software or a text editor function. Alternatively, the system for supporting document preparation of one embodiment of the present invention may be independent of the word processing software or the text editor function.

The document that can be received with the system for supporting document preparation of one embodiment of the present invention is not limited to a particular document, and may be various types of document. Examples of the document include patent application documentation, books, magazines, newspaper, contract agreement, academic papers (including treatises, theses, dissertations, essays, and articles), decision documents, terms and conditions, product manuals, novels, paper publications, white papers, technical documents, and business papers. As specific examples of patent application documentation, one or more of a patent specification, a scope of claims, and an abstract before being filed can be given.

In addition, the system for supporting document preparation of one embodiment of the present invention can show parts with a contradiction relation in one document.

Specifically, the system for supporting document preparation of one embodiment of the present invention receives one piece of document data first, then divides the document data into a plurality of blocks, and calculates a value representing the strength of a relation between two blocks of the plurality of blocks, for each combination. Furthermore, the system for supporting document preparation determines presence or absence of establishment of contradiction between two blocks of the plurality of blocks, for each combination, and shows a combination of two blocks that has a value representing the strength of a relation between the two blocks greater than or equal to a reference value and that is determined to have an established contradiction relation.

Alternatively, the system for supporting document preparation of one embodiment of the present invention receives one piece of document data first, then divides the document data into a plurality of blocks, and then classifies textual entailment between two of the plurality of blocks into any of entailment, contradiction, and neutral, for each combination. Furthermore, the system for supporting document preparation shows a combination of two blocks whose textual entailment is classified as the contradiction.

In this manner, the system for supporting document preparation of one embodiment of the present invention can show two blocks that have a contradiction relation in a document. Therefore, the user can easily find a part that should be edited in the document and efficiently prepare the document.

The system for supporting document preparation of one embodiment of the present invention can show both a part with a change in texture entailment in a document before and after revision and parts with a contradiction in the document after revision. In that case, the efficiency of preparation or editing of a document can be further improved.

<System for Supporting Document Preparation 1>

FIG. 1 illustrates a block diagram of a system for supporting document preparation 100. The system for supporting document preparation 100 includes a reception unit 110, a storage unit 120, a processing unit 130, an output unit 140, and a transmission path 150.

The system for supporting document preparation 100 may be provided in a data processing device such as a personal computer used by a user. Alternatively, a processing unit for the system for supporting document preparation 100 may be provided in a server to be accessed and used with a client PC via a network.

Although the block diagram in drawings attached to this specification illustrates components classified by their functions in independent blocks, it is difficult to classify actual components by their functions completely, and one component can have a plurality of functions. For example, a part of the processing unit 130 may function as the reception unit 110. In addition, one function can be involved in a plurality of components. For example, a plurality of kinds of processing executed by the processing unit 130 may be executed in different servers depending on processing content.

[Reception Unit 110]

The reception unit 110 receives document data. Furthermore, the reception unit 110 receives data of a designated block or the like. Data supplied to the reception unit 110 is supplied to one or both of the storage unit 120 and the processing unit 130 through the transmission path 150.

[Storage Unit 120]

The storage unit 120 has a function of storing a program to be executed by the processing unit 130. The storage unit 120 may have a function of storing data (e.g., a calculation result and an inference result) generated by the processing unit 130, data input to the reception unit 110, and the like.

The storage unit 120 includes at least one of a volatile memory and a nonvolatile memory. Examples of the volatile memory include a dynamic random access memory (DRAM) and a static random access memory (SRAM). Examples of the nonvolatile memory include a resistive random access memory (ReRAM, also referred to as a resistance-change memory), a phase-change random access memory (PRAM), a ferroelectric random access memory (FeRAM), a magnetoresistive random access memory (MRAM, also referred to as a magnetoresistive memory), and a flash memory. The storage unit 120 may include a recording media drive. Examples of the recording media drive include a hard disk drive (HDD) and a solid state drive (SSD).

[Processing Unit 130]

The processing unit 130 has a function of performing processing such as calculation and inference with the use of data supplied from one or both of the reception unit 110 and the storage unit 120. The processing unit 130 can supply processed data (e.g., a calculation result or an inference result) to one or both of the storage unit 120 and the output unit 140.

The processing unit 130 has a function of dividing the document data into a plurality of blocks.

Furthermore, the processing unit 130 has a function of dividing first document data into a plurality of first blocks, dividing second document data into a plurality of second blocks, and determining the second blocks corresponding to the respective first blocks. A combination of the first block and the second block that correspond to each other is also referred to as a first combination. The processing unit 130 also has a function of extracting a second combination of the first block and the second block that correspond to each other and have a difference therebetween. The second combination is a combination of the first combinations in which there is a difference between the first block and the second block.

In addition, the processing unit 130 has a function of calculating a value representing the strength of a relation between two blocks.

The processing unit 130 has a function of classifying textual entailment or contradiction between two blocks. For example, the processing unit 130 has a function of determining whether textual entailment or contradiction is established between two blocks. The processing unit 130 may classify the textual entailment or contradiction between two blocks into three or more kinds, for example, three kinds of entailment, contradiction, and neutral.

The processing unit 130 has a function of extracting a combination of two blocks on the basis of a value representing the strength of a relation and classification of textual entailment or contradiction.

The processing unit 130 can include an arithmetic circuit, for example. The processing unit 130 can include, for example, a central processing unit (CPU).

The processing unit 130 may include a microprocessor such as a digital signal processor (DSP) or a graphics processing unit (GPU). The microprocessor may be configured with a programmable logic device (PLD) such as a field programmable gate array (FPGA) or a field programmable analog array (FPAA). The processing unit 130 can interpret and execute instructions from programs to process various kinds of data and control programs. The programs to be executed by the processor are stored in at least one of the storage unit 120 and a memory region of the processor.

The processing unit 130 may include a main memory. The main memory includes at least one of a volatile memory such as a random access memory (RAM) and a nonvolatile memory such as a read only memory (ROM).

For example, a DRAM, an SRAM, or the like is used as the RAM, a virtual memory space is assigned and utilized as a working space of the processing unit 130. An operating system, an application program, a program module, program data, a look-up table, and the like which are stored in the storage unit 120 are loaded into the RAM for execution. The data, program, and program module which are loaded into the RAM are each directly accessed and operated by the processing unit 130.

The ROM can store a basic input/output system (BIOS), firmware, and the like for which rewriting is not needed. Examples of the ROM include a mask ROM, a one-time programmable read only memory (OTPROM), and an erasable programmable read only memory (EPROM). Examples of the EPROM include an ultra-violet erasable programmable read only memory (UV-EPROM) which can erase stored data by irradiation with ultraviolet rays, an electrically erasable programmable read only memory (EEPROM), and a flash memory.

The system for supporting document preparation preferably uses artificial intelligence (AI) for at least part of processing.

In particular, the system for supporting document preparation preferably uses an artificial neural network (ANN; hereinafter just referred to as neural network in some cases). The neural network can be constructed with circuits (hardware) or programs (software).

In this specification and the like, the neural network indicates a general model having the capability of solving problems, which is modeled on a biological neural network and determines the connection strength of neurons by the learning. The neural network includes an input layer, a middle layer (hidden layer), and an output layer.

In the description of the neural network in this specification and the like, to determine a connection strength of neurons (also referred to as weight coefficient) from the existing information is referred to as "leaning" in some cases.

In this specification and the like, to draw a new conclusion from a neural network formed with the connection strength obtained by learning is referred to as "inference" in some cases.

For example, processing using AI can be applied to one or more of the functions such as a function of determining two blocks that correspond to each other, a function of extracting two blocks that correspond to each other and have a difference therebetween, a function of calculating a value representing the strength of a relation between two blocks, and a function of classifying textual entailment or contradiction between two blocks.

[Output Unit 140]

The output unit 140 outputs information on the basis of a processing result by the processing unit 130. For example, the output unit 140 can supply one or both of the calculation result and the inference result by the processing unit 130 to the outside of the system for supporting document preparation 100. The output unit 140 can output information to a terminal, a display or the like used by the user.

[Transmission Path 150]

The transmission path 150 has a function of transmitting data. Data transmission and reception among the reception unit 110, the storage unit 120, the processing unit 130, and the output unit 140 can be performed through the transmission path 150.

A document search method and a method for outputting a document search result of the system for supporting document preparation of one embodiment of the present invention are described with reference to FIG. 2 to FIG. 6. Note that a method for showing a result using a display device is given below as an example of the output method. That is, the method for showing a document search result of one embodiment of the present invention is described below.

<Method for Supporting Document Preparation 1>

Figure 2:
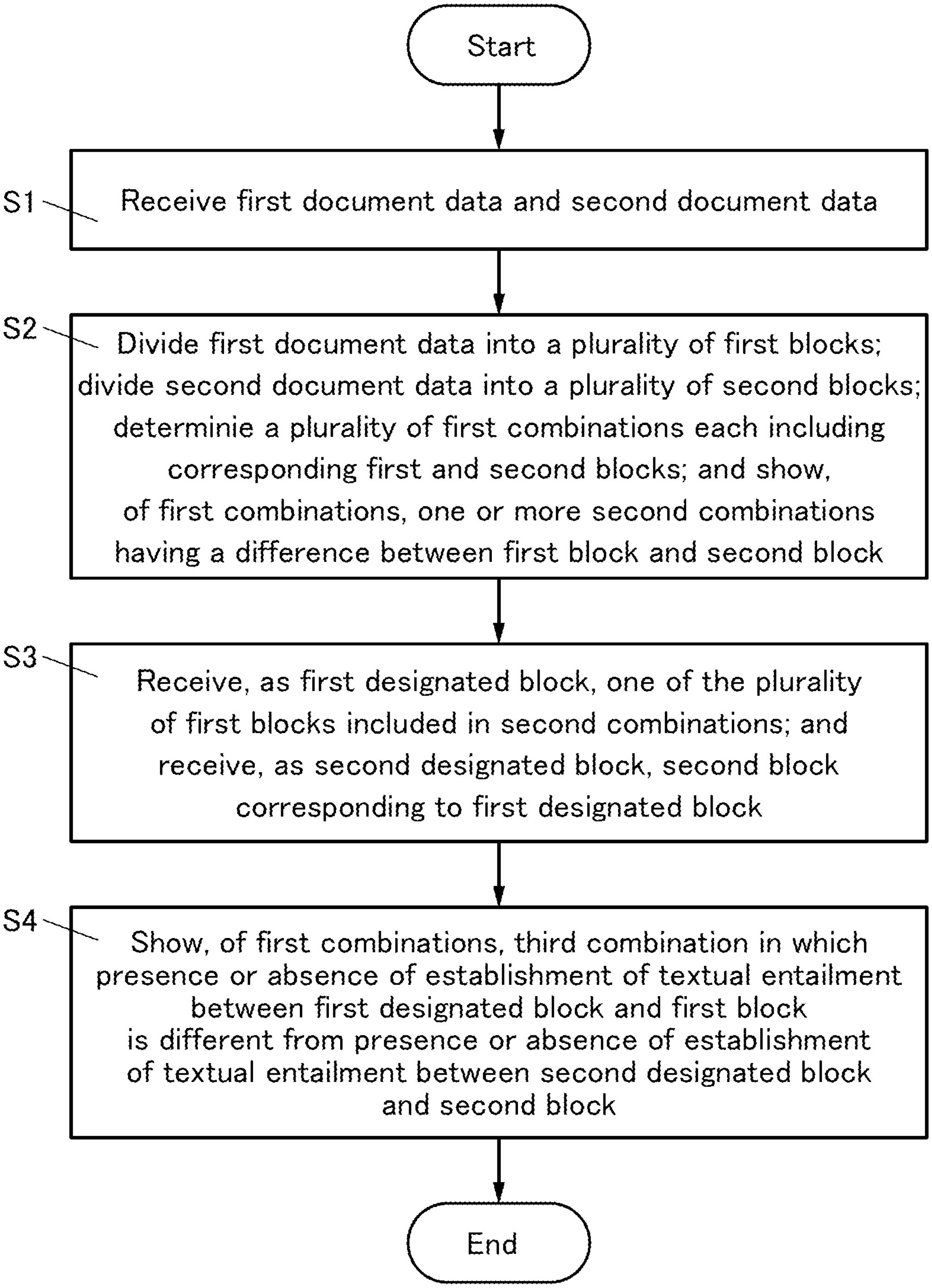
FIG. 2 illustrates an example of a method for supporting document preparation.

A method for supporting document preparation 1 of this embodiment includes processing of Step S1 to Step S4 illustrated in FIG. 2. FIGS. 3A and 3B and FIGS. 4A and 4B each illustrate the method for supporting document preparation 1. The examples illustrated in FIGS. 3A and 3B and FIGS. 4A and 4B can each be an example of a graphical user interface (GUI) of the system for supporting document preparation of this embodiment. Windows, text boxes, and the like in FIGS. 3A and 3B and FIGS. 4A and 4B are non-limiting examples. A GUI can be constructed as a web page accessed by a user via a network. Alternatively, a GUI can be constructed as a screen of a program application executed on an information processing device such as a personal computer used by a user.

[Step S1]

In Step S1, first document data and second document data are received. Here, a user can input two pieces of document data to be compared to the system. As the first and second document data, document data before and after revision can be given, for example. In the following example, the first data is document data before revision and the second data is document data after revision.

The first and second document data each contain text data. The first and second document data may each contain data other than text data (e.g., image data). Note that steps following Step S2 are mainly performed using text data.

[Step S2]

In Step S2, the first document data is divided into a plurality of first blocks, the second document data is divided into a plurality of second blocks, and a plurality of first combinations each including corresponding first and second blocks are determined.

One block includes at least one sentence. For example, the document can be divided into blocks, in which one paragraph is regarded as one block. Alternatively, the document may be divided by headlines in the document, or by sentences, that is, one block for one sentence.

Preferably, similarities of the plurality of first blocks and the plurality of second blocks are calculated and the first combinations are determined on the basis of the similarities.

For example, the similarity between two blocks can be calculated on the basis of the degree of matching in characters (also referred to as the degree of matching in character strings) of the two blocks.

Each block may be vectorized (quantified) and the similarity or distance between two blocks may be calculated.

A variety of methods are given as a method for vectorizing text. For example, one or both of morphological analysis and compound word analysis may be performed to divide a block into phrases or words. Vectorization of each block with use of divided words or phrases may be performed.

Examples of the method for vectorizing text according to the frequency of words include term frequency-inverse document frequency (TF-IDF) and Bag-of-Words.

In addition, for example, a model in which a block is converted into distributed representation is learned by machine learning and the distributed representation of each block can be obtained by using the model. A neural network is preferably used as the model.

The similarity between two vectors is calculated using cosine similarity, covariance, unbiased covariance, Pearson product-moment correlation coefficient, or the like. Among them, especially cosine similarity is preferably used.

The distance between two vectors is calculated using Euclidean distance, standard (standardized, average) Euclidean distance, Mahalanobis distance, Manhattan distance, Chebyshev distance, Minkowski distance, or the like.

A method for calculating the similarity or distance between two blocks is not particularly limited. For example, in Step S2, a variety types of models with which a similarity or distance can be calculated can be used.

For example, a method for determining the relation between two blocks with use of the similarity or distance is as follows: for each first block, a second block which has the highest similarity (distance closest) to the first block can be determined to correspond to the first block. Note that one-to-one correspondence between the first block and the second block is performed so that no other first blocks can correspond to the concerned second block.

In addition, the threshold value of the similarity or distance is preferably determined in advance. For example, if similarities of all of the second blocks to a certain first block are lower than the threshold value (or if the distances of all of the second blocks are larger than the threshold value), it is preferably considered that no second block corresponds to the first block. In this manner, the first and second blocks can correspond to each other with a high accuracy.

In Step S2, of the first combinations, one or more second combinations having a difference between the first and second blocks is shown.

Whether or not there is a difference between the first block and the second block can be determined with use of the similarity or distance used for the correspondence of the first block and the second block.

Specifically, in the case of calculating the similarity within the range of 0 to 1, the similarity between the first block and the second block is 1, meaning that there is no difference between the two blocks. On the other hand, the similarity between the first block and the second block is smaller than 1, meaning that there is a difference between the two blocks.

Furthermore, in the case of calculating the distance within the range of 0 to 1, the distance between the first block and the second block is 0, meaning that there is no difference between the two blocks. On the other hand, the distance between the first block and the second block is greater than 0, meaning that there is a difference between the two blocks.

Figure 3A:
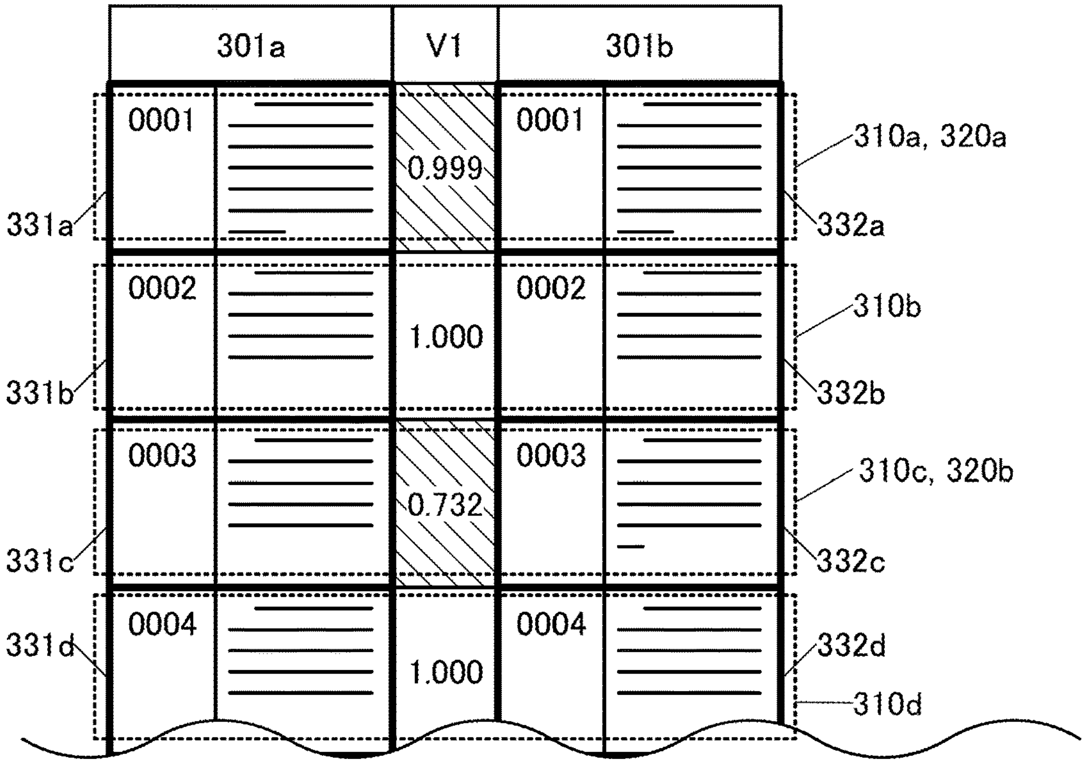
FIGS. 3A and 3B illustrate examples of methods for supporting document preparation.

In FIG. 3A, first document data 301*a* is divided into a plurality of first blocks. Four first blocks 331*a*, 331*b*, 331*c*, and 331*d* are illustrated in FIG. 3A. In a similar manner, in FIG. 3A, second document data 301*b* is divided into a plurality of second blocks. Four second blocks 332*a*, 332*b*, 332*c*, and 332*d* are illustrated in FIG. 3A.

FIG. 3A illustrates an example in which paragraph numbers (0001, 0002, 0003, and 0004) and text are displayed in each of the first block and the second block.

In FIG. 3A, a similarity V1 is shown between the first document data 301*a* and the second document data 301*b*.

In FIG. 3A, the first block 331*a* and the second block 332*a* are blocks corresponding to each other. In FIG. 3A, the first block 331*a* and the second block 332*a* are collectively represented as a first combination 310*a*. The similarity V1 between the first block 331*a* and the second block 332*a* is 0.999, which shows a difference, and thus the first block 331*a* and the second block 332*a* are also represented as a second combination 320*a*.

In FIG. 3A, similarities V1 smaller than 1 are shown as hatch patterns. To show the second combination, similarities V1 smaller than 1 or blocks of the second combination are preferably highlighted. Alternatively, a list or the like of second combinations may be separately formed and shown or output.

The first block 331*b* and the second block 332*b* are blocks that correspond to each other, and the similarity V1 between the first block 331*b* and the second block 332*b* is 1.000. In FIG. 3A, the first block 331*b* and the second block 332*b* are collectively represented as a first combination 310*b*.

The first block 331*c* and the second block 332*c* are blocks that correspond to each other. In FIG. 3A, the first block 331*c* and the second block 332*c* are collectively represented as a first combination 310*c*. The similarity V1 between the first block 331*c* and the second block 332*c* is 0.732, which shows a difference, and thus the first block 331*c* and the second block 332*c* are also represented as a second combination 320*b*.

The first block 331*d* and the second block 332*d* are blocks that correspond to each other, and the similarity V1 between the first block 331*d* and the second block 332*d* is 1.000. In FIG. 3A, the first block 331*d* and the second block 332*d* are collectively represented as a first combination 310*d*.

In the example in FIG. 3A, the paragraph numbers in the corresponding first and second blocks are the same, but are not necessarily limited to the same number. The paragraph numbers in the first block and the second block may be different from each other (for example, a combination of the paragraph 0004 and the paragraph 0005).

A difference in text between the corresponding blocks is preferably colored and displayed. This allows the user to grasp easily the difference in text between the corresponding blocks.

[Step S3]

In Step S3, one of the plurality of first blocks included in the second combinations, is received as a first designated block, and the second block corresponding to the first designated block is received as a second designated block.

The user of the system for supporting document preparation of one embodiment of the present invention can designate one or more combinations from the second combinations shown. The following example describes a case in which the second combination 320*b* is selected.

For example, in the case in which the user selects the second combination 320*b* in FIG. 3A, the user may select an area relating to the second combination 320*b* (for example, either the similarity V1 of the second combination 320*b*, the first block 331*c*, or the second block 332*c*). In other words, in the system for supporting document preparation of one embodiment of the present invention, when the reception unit 110 receives a selection relating to any one of the second combination 320*b*, the first block 331*c*, and the second block 332*c* as a user's selection, the processing unit 130 can judge that the second combination 320*b* is selected, the first designated block is the first block 331*c*, and the second designated block is the second block 332*c*. Accordingly, the reception of the first designated block and the second designated block is completed.

In the case in which only one second combination is shown, the first designated block and the second designated block can be specified on the basis of the second combination, in Step S2. In other words, the user operation is not necessarily needed in Step S3.

[Step S4]

In Step S4, of the first combinations, a third combination is shown in which presence or absence of establishment of the textual entailment between the first designated block and the first block is different from presence or absence of establishment of the textual entailment between the second designated block and the second block.

For example, recognizing textual entailment (RTE) using bidirectional encoder representations from transformers (BERT) of a natural language processing model can be performed (see Non-patent document 1). The recognizing textual entailment is a task to determine whether or not textual entailment is established between two sentences or texts. In the task, general language understanding evaluation (GLUE) benchmark is used, for example.

A discriminator (also referred to as a classifier) using such a natural language processing model is prepared and it can be determined whether or not the textual entailment is established between two blocks.

Alternatively, a rule-based system may be used for the determination. For example, conjunctions, particles, and auxiliary verbs as well as nouns are used for comparison and thus it can be determined with a high accuracy whether or not textual entailment is established between sentences.

First determination values of all the first blocks other than the first designated block are preferably calculated for determination of presence or absence of textual entailment between the first blocks and the first designated block. Similarly, second determination values of all the second blocks other than the second designated block are preferably calculated for determination of presence of absence of textual entailment between the second blocks and the second designated block. The first determination value and the second determination value are each determined in the numerical range including negative values and positive values. For example, the determination value is preferably set to a positive value in the case of establishment of textual entailment and to a negative value in the case of not establishment of textual entailment.

In this embodiment, an example in which the first determination value and the second determination value are within the range of −1 to 1 is described. When the determination value is a positive value closer to 1, it can be considered that two blocks clearly have textual entailment. On the other hand, when the determination value is a negative value closer to −1, it can be considered that two blocks clearly have no textual entailment.

The third combination is preferably a combination in which a product of the first determination value and the second determination value is a negative value, of the first combinations. When the product of the first determination value and the second determination value is a negative value, the determination value of one block is a positive value and the determination value of the other block is a negative value. In other words, the texture entailment between the one block and its designated block is established and the texture entailment between the other block and its designated block is not established. In this manner, by calculating a product of the first determination value and the second determination value, the third combination can be extracted.

Note that all the combinations in which the product of the first determination value and the second determination value is a negative value may be extracted as third combinations, or some of the combinations in which the product of the first determination value and the second determination value is a negative value may be extracted as third combinations on the basis of a reference value that is set separately.

Figure 3B:
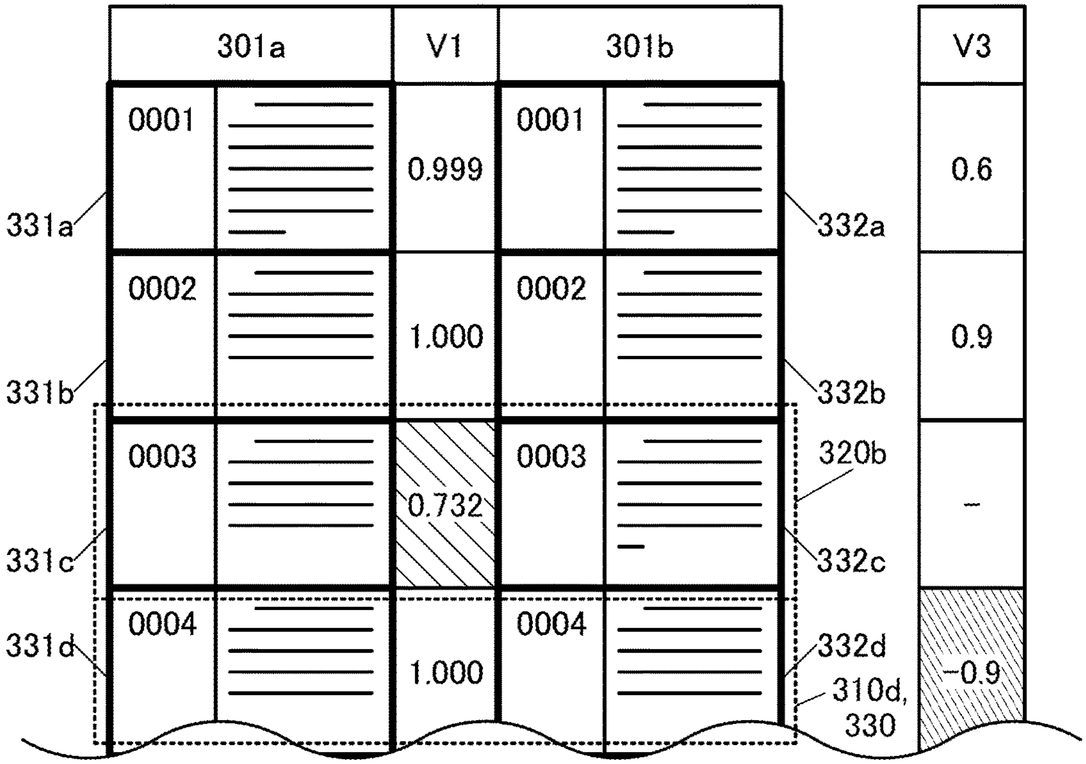

FIG. 3B illustrates an example in which the product of the first determination value and the second determination value is shown as a determination value V3.

FIG. 3B illustrates an example in which the determination value V3 is −0.9 when presence or absence of establishment of the textual entailment between the paragraph 0003 (the first block 331*c*, the first designated block) and the paragraph 0004 (the first block 331*d*) in the first document data 301*a* is compared with presence or absence of the establishment of the textual entailment between the paragraph 0003 (the second block 332*c*, the second designated block) and the paragraph 0004 (the second block 332*d*) in the second document data 301*b*. That is, the combination of the first block 331*d* and the second block 332*d* is found to be a third combination 330. In FIG. 3B, the determination value V3 with a negative value is shown as a hatch pattern. To show the third combination, the determination values V3 or blocks included in the third combination are preferably highlighted. Alternatively, a list or the like of the third combinations may be separately formed and shown or output.

In this example, in the document data before and after editing, there is a difference in the paragraph 0003 (the similarity is smaller than 1) and there is no difference in the paragraph 0004 (the similarity is 1). In the document data before and after editing, the textual entailment between the paragraph 0003 and the paragraph 0004 is changed; thus, it can be said to be highly probable that the paragraph 0004 is required to be edited in accordance with a change in the paragraph 0003.

FIG. 3B illustrates an example in which the determination value V3 in the comparison between the paragraph 0003 and the paragraph 0001 is 0.6 and the determination value V3 in the comparison between the paragraph 0003 and the paragraph 0002 is 0.9. These determination values V3 are positive values, which shows no change in the relation between the blocks before and after editing.

Note that in Step S4, with regard to the establishment of the textual entailment with the designated block, the determination values of all the other blocks may be calculated or the determination values of some of the other blocks may be calculated.

For example, in Step S4, in only blocks that have strong relations to the designated block, it is determined whether or not the textual entailment with the designated block is established to extract the third combination. Accordingly, the evaluation of the textual entailment in blocks with weak relations can be reduced, thereby decreasing the number of calculations to determine presence or absence of the establishment of the textual entailment.

Of the plurality of second blocks in the document data after revision, for example, for a second block having a value representing the strength of a relation with the second designated block which is higher than or equal to a reference value, it is preferable to determine whether or not the textual entailment with the second designated block is established. It is preferable to determine whether or not the textual entailment between the first block corresponding to the second block and the first designated block is established. In this manner, it becomes easy to confirm the consistency between the two blocks having a strong relation in the document data after revision.

In addition, of the plurality of first blocks in the document data before revision, for a first block having a value representing the strength of a relation with the first designated block which is higher than or equal to a reference value, it is acceptable to determine whether or not the textual entailment with the first designated block is established. It is acceptable to determine whether or not the textual entailment between the second block corresponding to the first block and the second designated block is established.

An intermediate representation of text is obtained and the similarity between two blocks can be calculated using the above-described natural language processing model, BERT, for example. The similarity can be used as a value representing the strength of a relation between two blocks. In addition, the presence or absence of the relation between sentences and the strength of the relation between sentences are learned with the use of BERT, whereby the strength of the relation between the two blocks may be calculated.

Alternatively, a rule-based system may be used for the determination. For example, nouns may be compared (for example, the matching degree of words is calculated) to calculate the similarity between blocks.

The method for calculating a value representing the strength of the relation between two blocks is not particularly limited. For example, the above-described calculation method of similarity or distance may be employed. In addition, a variety of kinds of models with which a similarity or a distance can be calculated may be used.

Specifically, in the case in which a similarity is calculated within the range of 0 to 1, the similarity between a designated block and a block is closer to 1, meaning that the relation between the two blocks is strong. Here, 0.60, 0.65, 0.70, 0.75, or 0.80 can be a reference value for the value representing the strength of the relation. The relation can be said to be strong as long as the similarity is higher than or equal to the reference value.

Figure 4A:
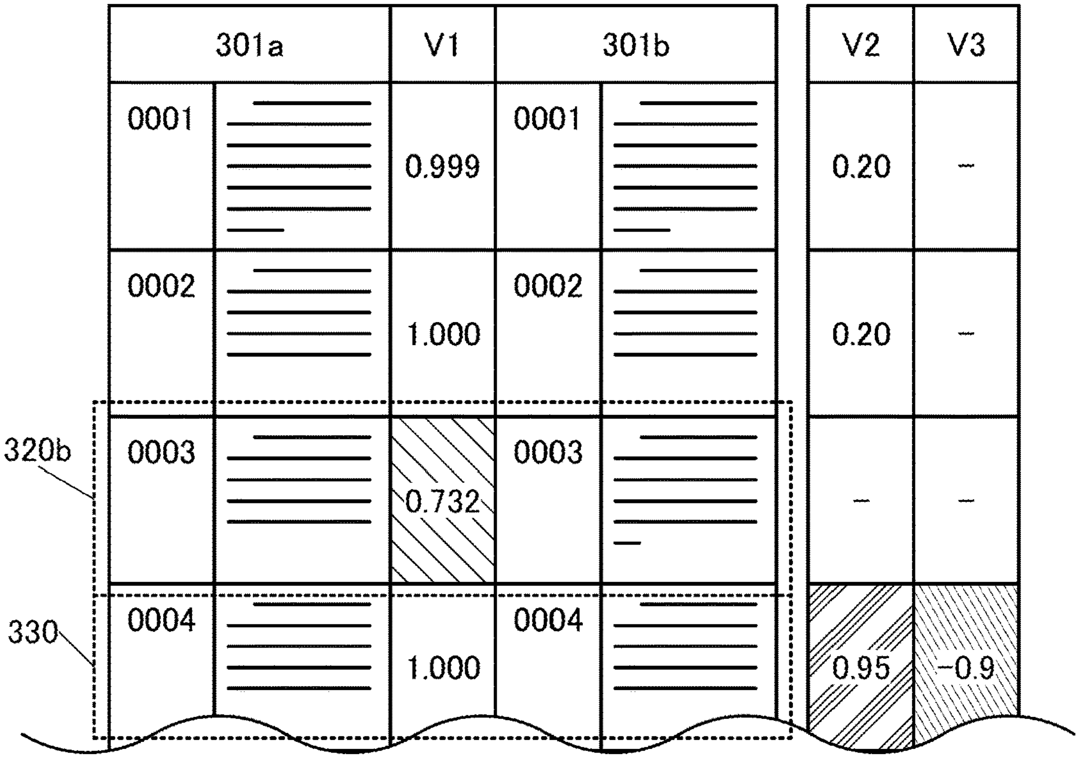
FIGS. 4A and 4B illustrate examples of methods for supporting document preparation.
Figure 4B:
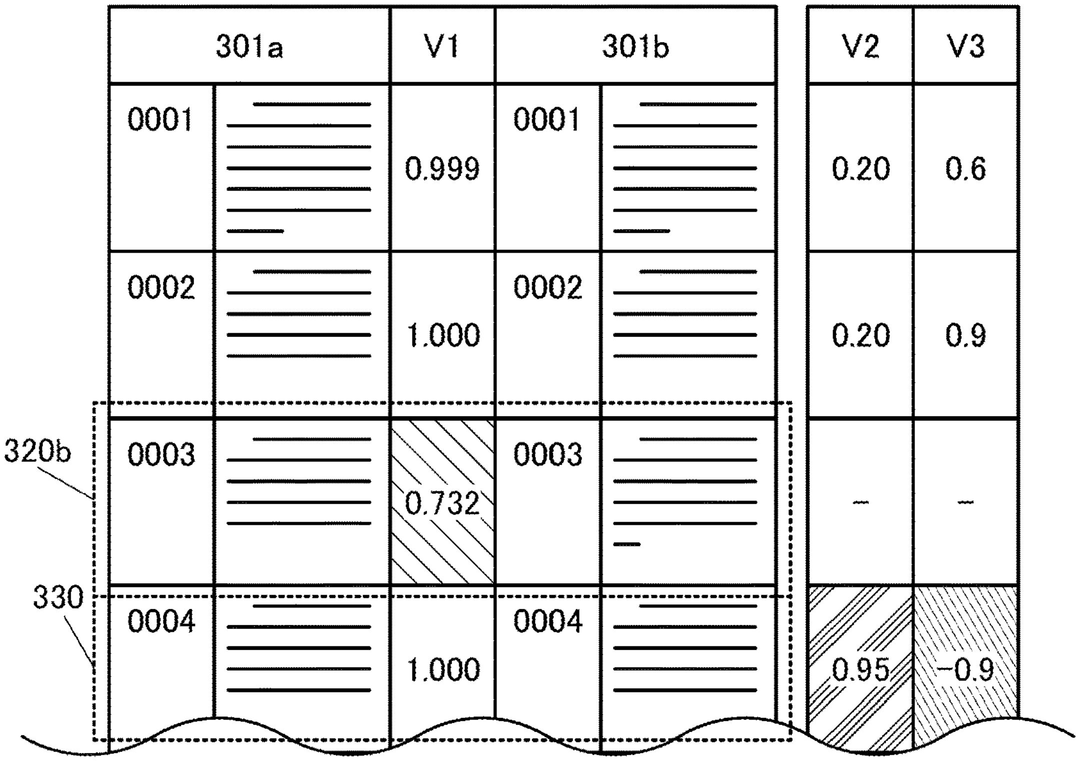

FIGS. 4A and 4B illustrate an example in which a value representing the strength of a relation between a block and the designated block is shown by a value V2. In the case in which the value V2 in the document data after revision is calculated, the value V2 representing the strength of the relation between the paragraph 0003 (the second designated block) and the paragraph 0004 in the second document data 301*b* is 0.95, meaning that the relation between the two paragraphs is strong. On the other hand, the value V2 representing the strength of the relation between the paragraph 0003 (the second designated block) and the paragraph 0001 or the paragraph 0002 in the second document data 301*b* is 0.20, meaning that the relation between the two paragraphs is weak.

In FIGS. 4A and 4B, the value V2 higher than or equal to the reference value is shown as a hatch pattern. The combination with a strong relation or the value V2 higher than or equal to the reference value is preferably highlighted in this manner.

FIG. 4A illustrates an example of calculating the determination value V3 of only a block having the value V2 higher than or equal to the reference value (e.g., the value V2 higher than or equal to 0.60), that is, a block having a strong relation with the designated block. Note that as illustrated in FIG. 4B, both the value V2 and the determination value V3 of all blocks may be calculated and shown.

The system for supporting document preparation of one embodiment of the present invention may have a document editing function. For example, a region where sentences of each block are shown may be a region in which text can be edited.

Through Step S4, it is found that the paragraph 0004 of the second document data 301*b* is required to be edited so as to in accordance with a change of the paragraph 0003. In a step after that, the user may directly edit the paragraph 0004 on a screen of the system. The edited content may be used for learning by the discriminator used in Step S4.

For example, preferably, the combination of the second block 332*c* serving as the second designated block and the second block 332*d* before editing is used as one piece of learning data having no establishment of textual entailment, and the combination of the second block 332*c* and the second block 332*d* after editing is used as one piece of learning data having establishment of textual entailment for learning by the discriminator.

As described above, in the system for supporting document preparation of one embodiment of the present invention, a portion where the relation between two blocks is changed in the document data before and after editing can be shown. Therefore, the user can easily grasp a part of the document which is required to be revised and efficiently prepare the document.

<Method for Supporting Document Preparation 2>

Figure 5:
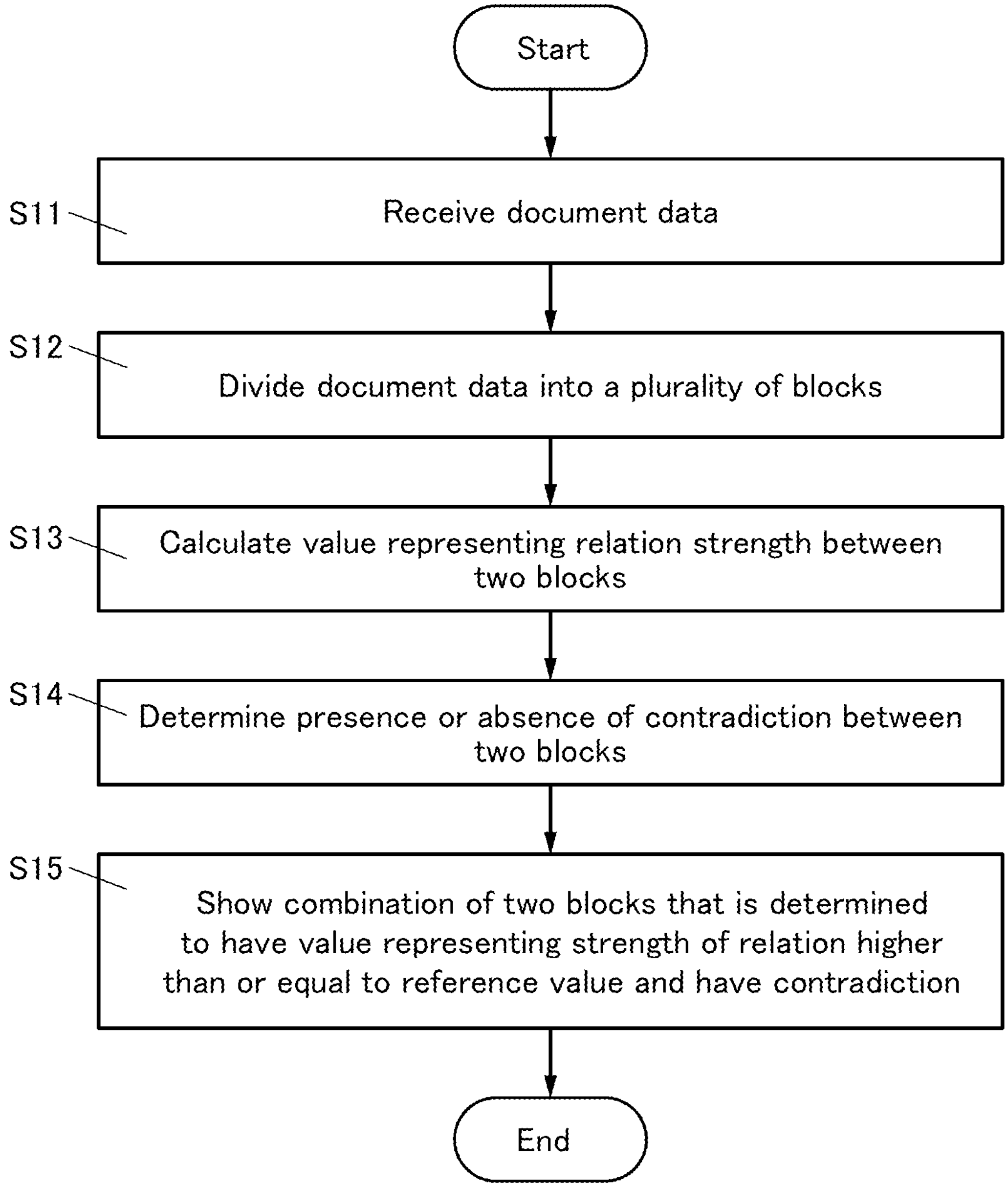
FIG. 5 illustrates an example of a method for supporting document preparation.
Figure 6:
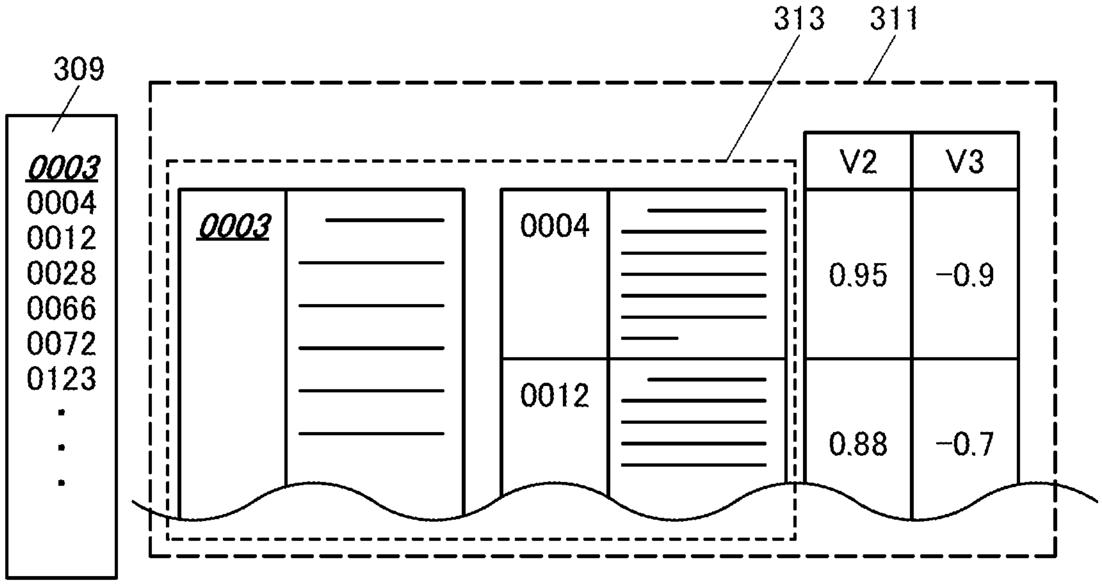
FIG. 6 illustrates an example of a method for supporting document preparation.

The method for supporting document preparation 2 of this embodiment includes processing of Step S11 to Step S15 illustrated in FIG. 5. FIG. 6 illustrates the method for supporting document preparation 2. FIG. 6 can be regarded as an example of a GUI related to the system for supporting document preparation in this embodiment.

The use of the method for supporting document preparation of one embodiment of the present invention is not limited to the comparison of document data before and after editing. For example, contents of paragraphs in one piece of document data can be compared, and presence or absence of contradiction in the paragraphs can be confirmed.

[Step S11]

In Step S11, document data is received.

The document data may contain at least text data, and further contain another piece of data (e.g., image data). Note that steps after Step S12 are mainly performed using text data.

[Step S12]

In Step S12, document data is divided into a plurality of blocks.

As a method for dividing the document data into the plurality of blocks, a method similar to Step S2 in the method for supporting document preparation 1 can be employed.

[Step S13]

In Step S13, a value representing the strength of the relation between two blocks is calculated. Here, a value representing the strength of the relation between any two blocks of the plurality of blocks is preferably calculated for each combination.

As a method for calculating the value representing the strength of the relation between two blocks, a method similar to the method for calculating the value V2 in Step S4 in the method for supporting document preparation 1 can be employed.

[Step S14]

In Step S14, it is determined whether or not contradiction between two blocks is established.

As a method for determining whether or not contradiction between two blocks is established, a method similar to the method for calculating the determination value V3 in Step S4 in the method for supporting document preparation 1 can be employed.

Specifically, a discriminator using a natural language processing model is prepared and it can be determined whether or not contradiction between two blocks is established.

Either Step S13 or Step S14 may be performed first, or both of them may be performed in parallel.

In Step S14, whether or not contradiction is established between two blocks of the plurality of blocks may be determined for all or some of the plurality of combinations. For example, in Step S14, whether or not contradiction is established between two blocks may be determined for only the combinations that are determined to have the strong relation between the two blocks in Step S13. Thus, the number of calculations can be reduced.

Note that in the case in which presence or absence of establishment of contradiction is determined as in the method for supporting document preparation 1, it is preferable to determine whether or not contradiction is established depending on a positive value or a negative value of the determination value.

In addition, as a method for determining whether or not contradiction between two blocks is established, textual entailment (or contradiction) between the two blocks may be classified into entailment, contradiction, and neutral. Here, the two blocks are classified as neutral, meaning that the two blocks have no textual entailment and no contradiction. As an example of classification as neutral, there is a case in which the relation between two blocks is weak. Therefore, in the case in which textual entailment is classified into three in Step S14, Step S13 may be omitted

[Step S15]

In Step S15, a combination of two blocks that is determined to have a value representing the strength of a relation higher than or equal to the reference value and have contradiction is shown.

First, a list of blocks included in combinations each having two blocks that are determined to have a value representing the strength of a relation higher than or equal to the reference value and have contradiction is shown.

FIG. 6 illustrates an example where document data is divided by paragraphs and paragraph numbers of objective blocks are shown in an area 309.

When a user selects one paragraph, information relating to a combination including the selected paragraph is displayed in an area 311. In the example in FIG. 6, the paragraph 0003 that is selected is shown with 0003 in italics.

In the area 311 illustrated in FIG. 6, paragraph numbers (such as 0003, 0004, and 0012) of blocks included in combinations and text are displayed in an area 313. In the area 311 illustrated in FIG. 6, the value V2 representing the strength of a relation and the determination value V3 to determine contradiction of each combination are displayed. In an example described here, when the determination value is a negative value closer to −1, it can be considered that two blocks clearly have contradiction.

Note that at least parts of the area 311 and the area 313 may be colored in accordance with the value V2 representing the strength of a relation or the determination value V3.

In FIG. 6, the combination of the paragraph 0003 and the paragraph 0004 and the combination of the paragraph 0003 and the paragraph 0012 are each exemplified as the combination of two blocks that is determined to have a value representing the strength of a relation higher than or equal to the reference value and have contradiction. The value V2 and the determination value V3 of the combination of the paragraph 0003 and the paragraph 0004 are 0.95 and −0.9, respectively. The value V2 and the determination value V3 of the combination of the paragraph 0003 and the paragraph 0012 are 0.88 and −0.7, respectively.

Note that in the case in which textual entailment is classified into three (entailment, contradiction, and neutral) in Step S14, only a combination of two blocks classified as contradiction is extracted, so that the combination with a strong relation and contradiction in the textual entailment can be extracted.

As described above, in the system for supporting document preparation of one embodiment of the present invention, the combination of two blocks with a strong relation and contradiction can be shown. Therefore, the user can easily grasp a part that is required to be edited in the document, and efficiently prepare the document.

As described above, the system for supporting document preparation of one embodiment of the present invention can compare two documents, and show a part with different textual entailment between the two documents. Furthermore, the system for supporting document preparation of one embodiment of the present invention can show a part with contradiction in one document. In this manner, the user can easily find a part that is required to be edited in the document. In addition, the user can easily find all parts to be edited. Therefore, the user can prepare the document with consistency efficiently.

This embodiment can be combined with any of the other embodiments as appropriate. In this specification, in the case in which a plurality of structure examples are shown in one embodiment, the structure examples can be combined as appropriate.

Embodiment 2

In this embodiment, a system for supporting document preparation of one embodiment of the present invention is described with reference to FIG. 7 and FIG. 8.

<System for Supporting Document Preparation 2>

Figure 7:
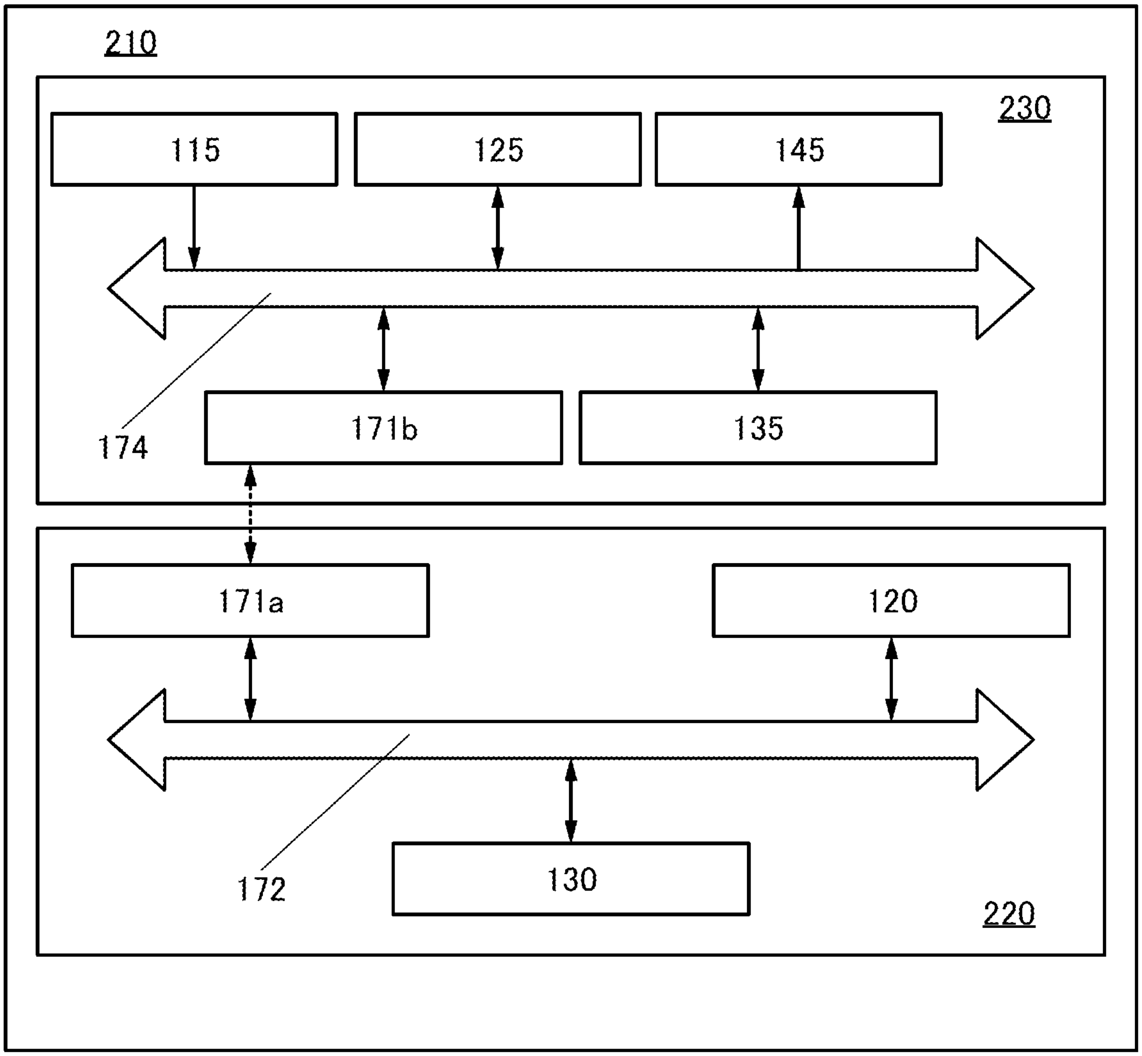
FIG. 7 illustrates an example of a system for supporting document preparation.

FIG. 7 is a block diagram of a system for supporting document preparation 210. The system for supporting document preparation 210 includes a server 220 and a terminal 230 (e.g., a personal computer). Note that the description of <System for supporting document preparation 1> in Embodiment 1 can be referred to for the same components as those in the system for supporting document preparation 100 illustrated in FIG. 1.

The server 220 includes a communication unit 171*a*, a transmission path 172, the storage unit 120, and the processing unit 130. Although not illustrated in FIG. 7, the server 220 may further include at least one of a reception unit, a database, an output unit, an input unit, and the like.

The terminal 230 includes a communication unit 171*b*, a transmission path 174, an input unit 115, a storage unit 125, a processing unit 135, and a display unit 145. Examples of the terminal 230 include a tablet personal computer, a personal computer such as a laptop personal computer or a desktop personal computer, and various portable information terminals. The terminal 230 may be a desktop personal computer without the display unit 145 and may be connected to a monitor functioning as the display unit 145, or the like.

A user of the system for supporting document preparation 210 inputs document data from the input unit 115 in the terminal 230 to the server 220. Furthermore, information on a designated block or the like can also be input. These input contents are transmitted from the communication unit 171*b* to the communication unit 171*a*.

The information received by the communication unit 171*a* is stored in a memory included in the processing unit 130 or the storage unit 120 via the transmission path 172. The information may be supplied from the communication unit 171*a* to the processing unit 130 via a reception unit (see the reception unit 110 illustrated in FIG. 1).

The processing unit 130 conducts various kinds of processing for preparing data to be shown in Step S2 and Step S4 described in <Method for supporting document preparation 1>, and processing in Step S12 to Step S14 and processing for preparing data to be shown in Step S15 described in <Method for supporting document preparation 2> in Embodiment 1. These kinds of processing require high processing capacity, and thus are preferably performed in the processing unit 130 included in the server 220. The processing unit 130 preferably has higher processing power than the processing unit 135.

A processing result of the processing unit 130 is stored in the memory included in the processing unit 130 or the storage unit 120 via the transmission path 172. After that, the processing result is output from the server 220 to the display unit 145 in the terminal 230. The processing result is transmitted from the communication unit 171*a* to the communication unit 171*b*. On the basis of the processing result of the processing unit 130, various kinds of data contained in a database may be transmitted from the communication unit 171*a* to the communication unit 171*b*. The processing result may be supplied from the processing unit 130 to the communication unit 171*a* via an output unit (the output unit 140 illustrated in FIG. 1).

[Communication Unit 171*a* and Communication Unit 171*b*]

The server 220 and the terminal 230 can transmit and receive data with the use of the communication unit 171*a* and the communication unit 171*b*. As the communication unit 171*a* and the communication unit 171*b*, a hub, a router, a modem, or the like can be used. Data may be transmitted and received through wire communication or wireless communication (e.g., radio waves or infrared rays).

[Transmission Path 172 and Transmission Path 174]

The transmission path 172 and the transmission path 174 have a function of transmitting data. The communication unit 171*a*, the storage unit 120, and the processing unit 130 can transmit and receive data via the transmission path 172. The communication unit 171*b*, the input unit 115, the storage unit 125, the processing unit 135, and the output unit 140 can transmit and receive data via the transmission path 174.

[Input Unit 115]

The input unit 115 can be used when the user designates document data, a block, or the like. For example, the input unit 115 can have a function of operating the terminal 230; specific examples thereof include a mouse, a keyboard, a touch panel, a microphone, a scanner, and a camera.

The system for supporting document preparation 210 may have a function of converting audio data into text data. For example, at least one of the processing unit 130 and the processing unit 135 may have this function.

The system for supporting document preparation 210 may have an optical character recognition (OCR) function. This enables characters contained in image data to be recognized and text data to be created. For example, at least one of the processing unit 130 and the processing unit 135 may have this function.

[Storage Unit 125]

The storage unit 125 may store one or both of the document data and the data supplied from the server 220. The storage unit 125 may include at least part of data that can be included in the storage unit 120.

[Processing Unit 130 and Processing Unit 135]

The processing unit 135 has a function of performing arithmetic operation or the like with the use of data supplied from the communication unit 171*b*, the storage unit 125, the input unit 115, or the like. The processing unit 135 may have a function of performing at least part of processing that can be performed by the processing unit 130.

Each of the processing unit 130 and the processing unit 135 can include one or both of a transistor including a metal oxide in its channel formation region (OS transistor) and a transistor including silicon in its channel formation region (Si transistor).

In this specification and the like, a transistor including an oxide semiconductor or a metal oxide in a channel formation region is referred to as an oxide semiconductor transistor or an OS transistor. A channel formation region of an OS transistor preferably includes a metal oxide.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case in which a metal oxide is used in a semiconductor layer of a transistor, the metal oxide is referred to as an oxide semiconductor in some cases.

The metal oxide included in the channel formation region preferably contains indium (In). When the metal oxide included in the channel formation region is a metal oxide containing indium, the carrier mobility (electron mobility) of the OS transistor is high. The metal oxide included in the channel formation region is preferably an oxide semiconductor containing an element M. The element M is preferably at least one of aluminum (Al), gallium (Ga), and tin (Sn). Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a combination of two or more of the above elements may be used as the element M The element M is, for example, an element that has high bonding energy with oxygen. The element M is, for example, an element that has higher bonding energy with oxygen than indium is. The metal oxide included in the channel formation region is preferably a metal oxide containing zinc (Zn). The metal oxide containing zinc is easily crystallized in some cases.

The metal oxide included in the channel formation region is not limited to the metal oxide containing indium. The semiconductor layer may be a metal oxide that does not contain indium and contains zinc, a metal oxide that does not contain indium and contains gallium, a metal oxide that does not contain indium and contains tin, or the like, e.g., zinc tin oxide or gallium tin oxide.

The processing unit 130 preferably includes an OS transistor. The OS transistor has an extremely low off-state current; therefore, with the use of the OS transistor as a switch for retaining electric charge (data) that has flowed into a capacitor functioning as a memory element, a long data retention period can be ensured. When at least one of a register and a cache memory included in the processing unit 130 has such a feature, the processing unit 130 can be operated only when needed, and otherwise can be off while data processed immediately before turning off the processing unit 130 is stored in the memory element. In other words, normally-off computing is possible and the power consumption of the system for supporting document preparation can be reduced.

[Display Unit 145]

The display unit 145 has a function of displaying an output result. Examples of the display unit 145 include a liquid crystal display device and a light-emitting display device. Examples of light-emitting elements that can be used in the light-emitting display device include an LED (Light Emitting Diode), an OLED (Organic LED), a QLED (Quantum-dot LED), and a semiconductor laser. It is also possible to use, as the display unit 145, a display device using a MEMS (Micro Electro Mechanical Systems) shutter element or an optical interference type MEMS element, or a display device using a display element employing a microcapsule method, an electrophoretic method, an electrowetting method, an Electronic Liquid Powder (registered trademark) method, or the like, for example.

Figure 8:
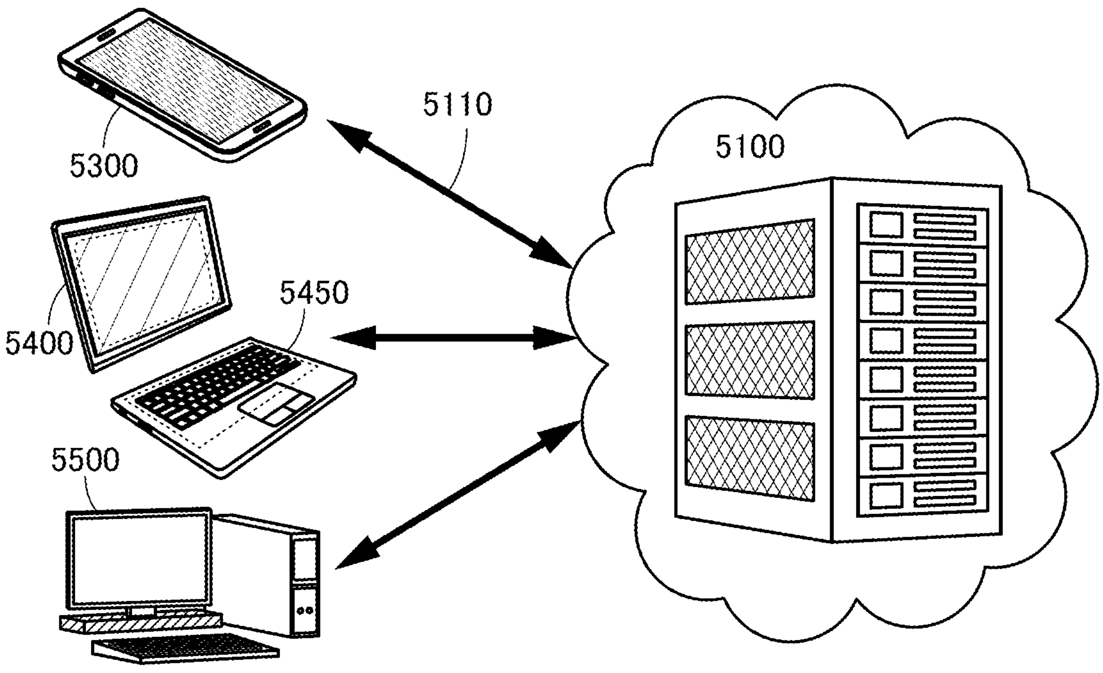
FIG. 8 illustrates an example of a system for supporting document preparation.

FIG. 8 is a conceptual diagram of the system for supporting document preparation of this embodiment.

The system for supporting document preparation illustrated in FIG. 8 includes a server 5100 and terminals (also referred to as electronic devices). Communication between the server 5100 and each terminal is conducted via an Internet connection 5110.

The server 5100 is capable of performing calculations using data input from the terminal via the Internet connection 5110. The server 5100 is capable of transmitting a calculation result to the terminal via the Internet connection 5110. Accordingly, the load of calculations on the terminal can be reduced.

In FIG. 8, an information terminal 5300, an information terminal 5400, and an information terminal 5500 are illustrated as the terminals. The information terminal 5300 is an example of a portable information terminal such as a smartphone. The information terminal 5400 is an example of a tablet terminal. When the information terminal 5400 is connected to a housing 5450 with a keyboard, the information terminal 5400 can be used as a notebook information terminal. The information terminal 5500 is an example of a desktop information terminal.

With such a structure, the user can access the server 5100 from the information terminal 5300, the information terminal 5400, the information terminal 5500, and the like. Then, through the communication via the Internet connection 5110, the user can receive a service offered by an administrator of the server 5100. Examples of the service include a service with the use of the method for supporting document preparation of one embodiment of the present invention. In the service, artificial intelligence may be utilized in the server 5100.

This embodiment can be combined with the other embodiment as appropriate.

This application is based on Japanese Patent Application Serial No. 2022-151570 filed with Japan Patent Office on Sep. 22, 2022, the entire contents of which are hereby incorporated by reference.

What is claimed is:

1. A method for supporting document preparation, comprising a step of:

receiving first document data and second document data;

dividing the first document data into a plurality of first blocks;

dividing the second document data into a plurality of second blocks;

determining a plurality of first combinations each including corresponding first and second blocks;

showing one or more second combinations with a difference between the corresponding first and second blocks, of the plurality of first combinations;

receiving, as a first designated block, any one of the plurality of first blocks included in the second combinations;

receiving, as a second designated block, the second block corresponding to the first designated block;

calculating a first determination value of each of first blocks other than the first designated block, regarding presence or absence of establishment of textual entailment with the first designated block;

calculating a second determination value of each of second blocks other than the second designated block, regarding presence or absence of establishment of textual entailment with the second designated block; and showing, of the first combinations, a third combination in which presence or absence of establishment of textual entailment between the first designated block and the first block is different from presence or absence of establishment of textual entailment between the second designated block and the second block, wherein the first determination value and the second determination value are each determined in a numerical range including both negative and positive values, wherein, of the first combinations, the third combination is a combination in which a product of the first determination value and the second determination value is a negative value, and wherein the second document data is revised first document data.

2. The method for supporting document preparation according to claim 1, wherein whether or not textual entailment is established between the first designated block and the first block having a value representing a strength of a relation with the first designated block that is higher than or equal to a reference value, of the plurality of first blocks.

3. The method for supporting document preparation according to claim 1, wherein a value representing a strength of a relation between the first block included in the third combination and the first designated block is shown, as well as the third combination.

4. The method for supporting document preparation according to claim 1, wherein a difference in text between the corresponding first and second blocks is colored and shown.

5. The method for supporting document preparation according to claim 1, wherein similarities between the plurality of first blocks and the plurality of second blocks are calculated, and the first combinations and the second combinations are both determined on the basis of the similarities.

6. The method for supporting document preparation according to claim 5, wherein distributed representations of the plurality of first blocks and distributed representations of the plurality of second blocks are obtained and the distributed representations of the plurality of first blocks are compared with the distributed representations of the plurality of second blocks to calculate the similarities.

7. The method for supporting document preparation according to claim 1, further comprising a step of receiving editing of text included in the third combination.

8. The method for supporting document preparation according to claim 7, wherein a discriminator is used in determining presence or absence of establishment of textual entailment between the first designated block and the first block, and wherein after receiving the editing of text, a combination of the first designated block and the first block before editing is used as one piece of learning data having no establishment of textual entailment, and a combination of the first designated block and the first block after editing is used as one piece of learning data having establishment of textual entailment for learning by the discriminator.

* * * * *